United States Patent Office 3,664,611
Patented May 23, 1972

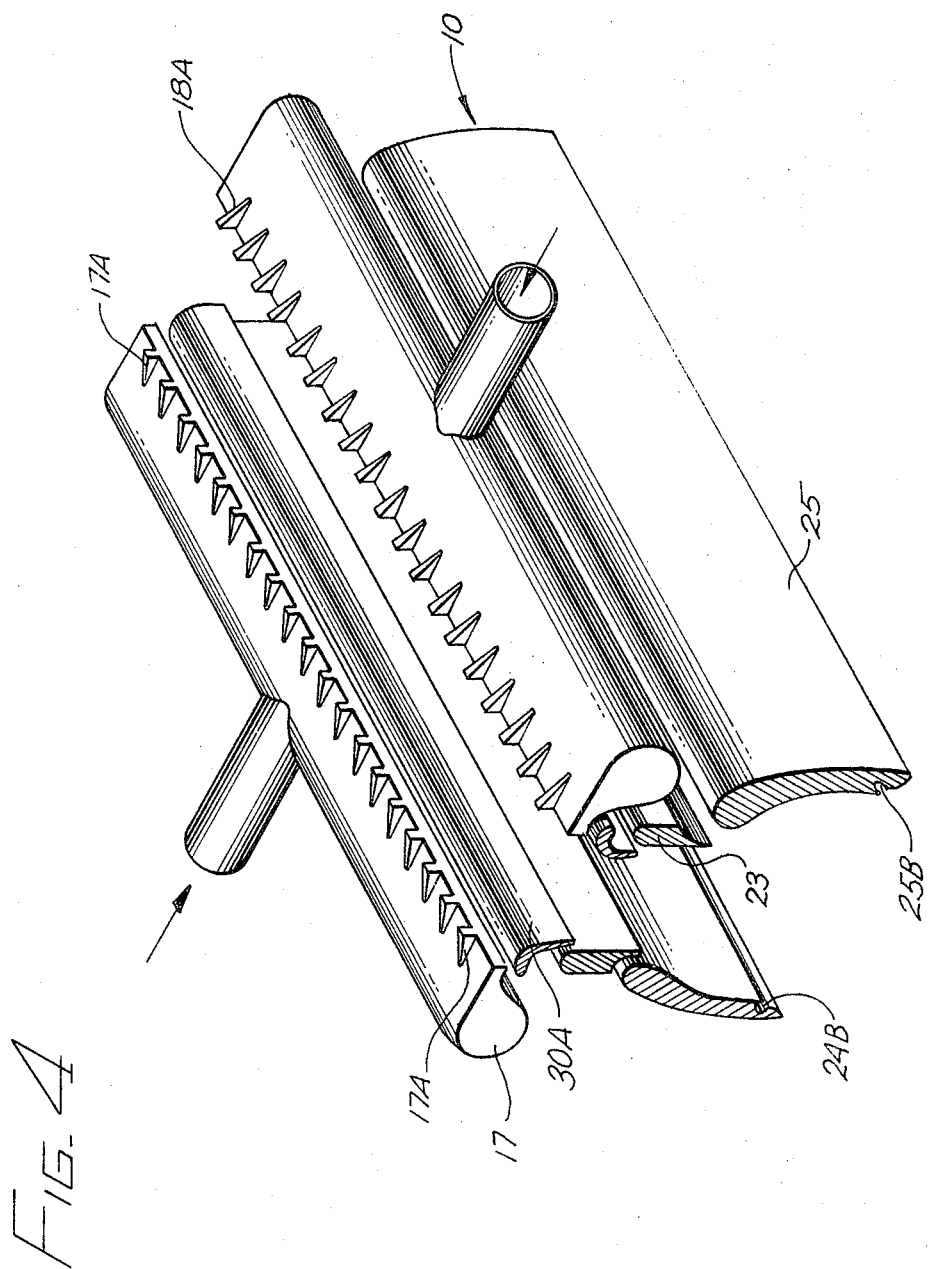

3,664,611
AERODYNAMIC VEHICLE
Gordon L. Harris, Alhambra, Calif., assignor to Flight
Dynamics Research Corporation, Burbank, Calif.
Filed Dec. 17, 1969, Ser. No. 885,940
Int. Cl. B64c 3/28, 3/00
U.S. Cl. 244—42 CD                                10 Claims

ABSTRACT OF THE DISCLOSURE

An aerodynamic vehicle capable of vertical take off and landing employing a jet ejector system utilizing the Coanda effect. The jet ejector system is constructed within the wing of the vehicle to receive the engine exhaust for vertically lifting the vehicle into flight. The ejector has fluid ducts for receiving and conveying the engine exhaust and dividing the exhaust flow into jet sheets. Coanda airfoils are arranged adjacent the fluid ducts for entraining the ambient air into the exhaust flow over their exterior surfaces and for rotating the flow through approximately 90°. A mixing chamber is arranged downstream of the airfoils for receiving and mixing the rotated jet sheets along with means for diffusing and controlling the boundary layer of the mixed flow.

---

This invention relates to a jet ejector lifting system for an aerodynamic vehicle and more particularly to a jet ejector for a vehicle capable of vertical take-offs and landings.

The requirement for short take-off and high performance aircraft from a military and a commercial point of view is well known. The use of ejectors for vertical take-offs and landings for such short take-off and high performance aircraft has also been explored. The ejector principle offers means of augmenting the thrust of jet nozzles without the necessity of employing dynamic machinery. It is also known that through the proper proportioning of the ejector secondary inlet flow very high values of thrust augmentation could be obtained with compact ejector systems. For the purposes of vertical take-offs and landings it is required that the jet flow be rotated through approximately 90° to effect the vertical lifting action on the aerodynamic vehicle. The known ejector systems effect this rotation of the jet flow or exhaust flow of the aerodynamic vehicle by means of a conventional Coanda wall jet ejector. Such prior art Coanda wall jet ejection systems include a pair of nozzles for conveying the exhaust or jet flow from the vehicle engine to two Coanda surfaces and exiting from the ejector by means of a diffuser. The Coanda ejector system is advantageous in that it can be completely integrated into a conventional aerodynamic vehicle or aircraft.

The present invention provides an improved jet ejector utilizing the Coanda effect. In particular, the jet ejector of the present invention may not only be readily integrated into the wings of a conventional aerodynamic vehicle but also the conventional Coanda surfaces have been replaced by airfoil means exposing more jet entrainment surface to the ambient air thereby drawing more ambient air into the jet stream to yield larger mass flow augmentation and thereby increased lifting thrust. The engine thrust augmentation is an improvement over prior art Coanda wall jet ejectors through the provision of slotted airfoils or airfoil cascades that allow the jet entrainment of the ambient air or the ambient air to be drawn into the system yielding large mass flow augmentation.

From the structural standpoint, the present invention comprises ejector means having a pair of serrated nozzles for receiving and conveying the engine exhaust and dividing the exhaust flow into separately serrated jet sheets. The jet sheets are exposed to Coanda airfoil means symmetrically arranged and spaced apart adjacent the nozzles for receiving the jet sheets over their exterior surfaces for rotating the jet sheets through approximately 90° and during this process entraining the ambient air. The rotated jet sheets are applied to a mixing chamber arranged downstream of the airfoil means and enter into the ambient air through diffusing means. The diffusing means may have boundary layer control means arranged adjacent the mixing chamber and jet nozzles at the exit of the diffusing means.

These and other features of the present invention may be more fully appreciated when considered in the light of the following specification and drawings, in which:

FIG. 4 is a diagrammatic representation of another ejector system embodying the invention with the inlet guide vanes omitted.

Figure 1:
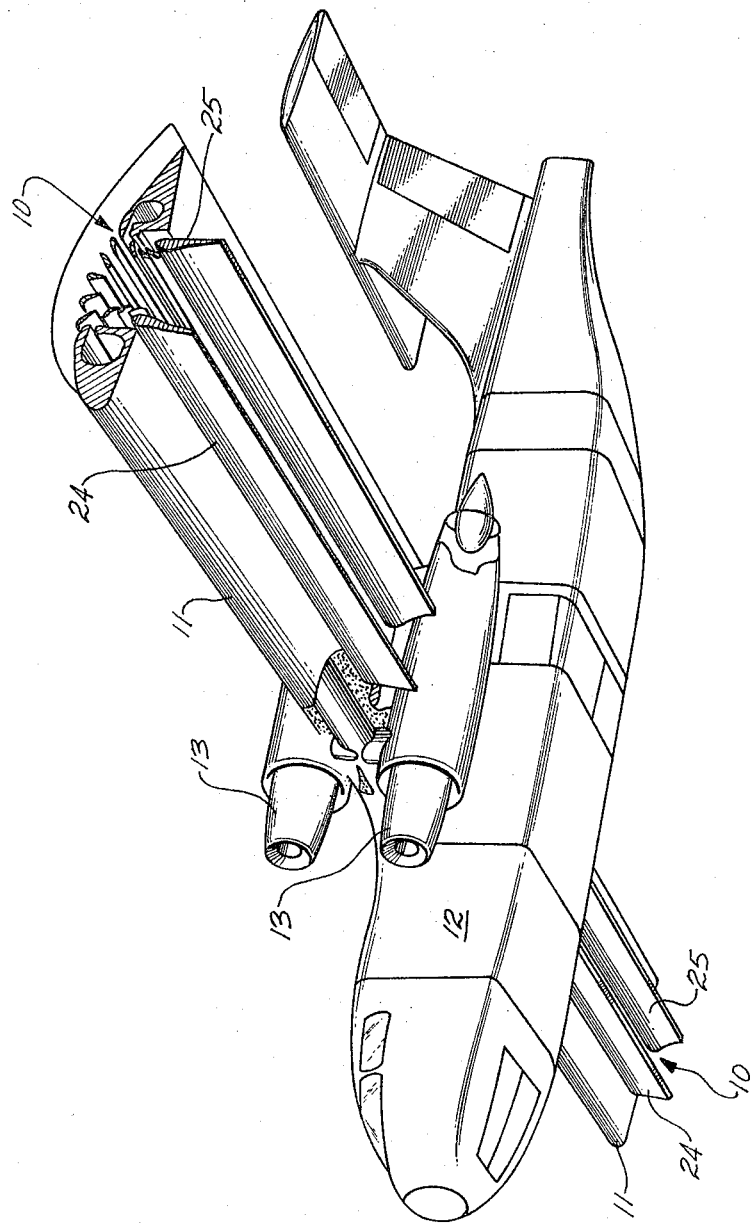
FIG. 1 is a perspective view of an aerodynamic vehicle capable of vertical take-off and landing embodying the ejector of the present invention.

The present invention will be described as it may be embodied in an aerodynamic vehicle or a more or less conventional aircraft as illustrated in FIG. 1. The ejector system 10 is illustrated as it is integrated into the wings 11 of the vehicle 12. The construction is such that the exhaust flow or jet stream from the jet engines 13 are conveyed to the ejector system 10 for effecting the desired take-offs and landings.

Figure 3:
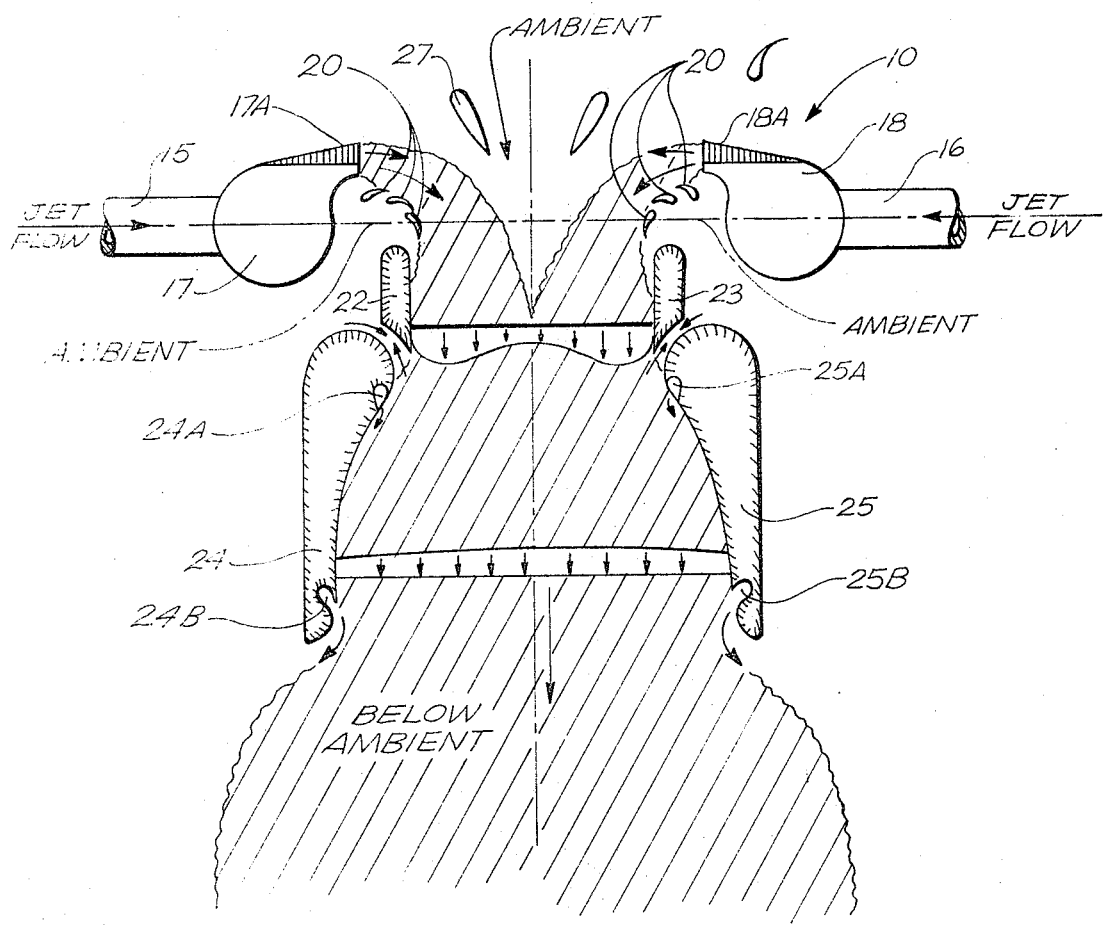
FIG. 3 is a diagrammatic representation of the ejector system of the present invention.

Now referring to FIG. 3, the structural details of the ejector system of the present invention will be examined in detail. The exhaust flow from the engines of the vehicle 12 or the jet flow through the ejector 10 is illustrated in FIG. 3 by means of shading. It will be recognized that the jet flow or exhaust from the engine is conveyed to the ejector by means of suitable ducting. The ducting is identified by the reference characters 15 and 16 that are provided with a pair of serrated nozzles 17 and 18 for dividing the exhaust or jet flow into two serrated jet sheets. It will be recognized that the nozzles 17 and 18 serrate the jet sheet issuing therefrom by means of the serrations 17ª and 18ª longitudinally spaced apart on the upper surfaces of the nozzles 17 and 18, as best illustrated in FIG. 4. The jet sheets issuing from the nozzles 17 and 18 are caused to rotate over the exterior surface of the airfoil means illustrated in FIG. 3 as a plurality of spaced apart airfoils 20. The airfoils 20 are arranged to cause the jet flow over their exterior surfaces for effecting the Coanda rotation.

It should be noted that the Coanda surfaces afforded by the airfoils 20 allow exposure to the ambient air and as a result cause a radial static pressure gradient to exist across the inlet of the ejector which produces flow induction or entrainment of the ambient air into the jet stream. The entrainment of the ambient air into the jet stream achieves a larger thrust augmentation not heretofore attainable with Coanda ejection systems.

The separate jet sheets are then conveyed through a mixing chamber 21 which is defined by a section within the boundaries spaced immediately downstream from the airfoils 20. The mixing chamber 21 is illustrated as defined by walls 22 and 23 that are constant or straight-sided sections. These walls, however, may be made to be convergent or divergent in accordance with the particular application of the ejection system. The exhaust flow is then applied to diffusing means spaced downstream from the walls 22 and 23 and are shown in the form of diffuser shrouds 24 and 25. The jet flow exiting from the ejector enters the ambient air from the shrouds 24 and 25.

It has been found that some boundary layer control means on the diffuser walls 24 and 25 is required to prevent boundary layer separation in the diffuser. This boundary layer control means is illustrated in FIG. 3 as apertures 24$^a$ and 25$^a$ arranged on the inside surfaces of the shrouds 24 and 25 and immediately below the walls 22 and 23. It has also been found that further flow diffusion may be achieved by taking advantage of the jet flap effect by locating thin jet nozzles at the exit of the diffuser. These jet nozzles are identified as the nozzles 24$^b$ and 25$^b$ defined in the shrouds 24 and 25 adjacent the jet exit end of the shrouds.

An important aspect of the present invention is in the configuration of the ejector system 10 illustrated in FIG. 3. The ambient air is entrained not only by means of the openings between the airfoils 20 but in addition tertiary slots T are defined between the walls 22 and 23 and the shrouds 24 and 25.

From the above description, it will be noted that the conventional Coanda wall used in such prior art ejector systems has been eliminated and the airfoil cascades 20 have been substituted therefor. The geometry of the airfoil cascades 20 and their relationship to one another exposes the ambient air to the jet stream thereby drawing more ambient air into the system. When the Coanda airfoils 20 are employed in this fashion to rotate the jet flow, a radial static pressure gradient exists across the ejector inlet producing a non-uniform or "skewed" secondary flow induction by means of the jet entrainment. Skewed flow induction can be shown to achieve larger thrust augmentation than heretofore achievable. This type of exterior cascade turning surface has two distinct advantages over the usual Coanda solid cylindrical surface. These advantages include better mixing efficiency as a result of the jet entrainment of the ambient fluid at both of its boundaries and since the cascade surface is intermittent the damping effect of the solid boundary on the jet turbulence structure is substantially reduced thereby permitting the jet to expand more rapidly and to entrain more ambient fluid resulting in the reduction of the required length of the ejector for a given thrust augmentation. In addition, such a cascade turning surface affords better pressure recovery since each airfoil element 20 of the cascade behaves aerodynamically as a small airfoil in the induced flow field and consequently each generates an individual lifting force normal to the direction of the jet discharge.

It should also be noted that the present invention may incorporate inlet guide vanes similar to the guide vanes 27 and 28 shown intermediate the nozzles 17 and 18 in FIG. 3. The addition of such inlet guide vanes 27 and 28 produce efficient pressure recovery through controlling the secondary inlet flow angle and which relates to the thrust augmentation performance of the system.

Now referring to FIG. 4 in particular, it will be noted that this embodiment of the ejector system 10 is substantially identical to that described in conjunction with FIG. 3. In this embodiment, however, the Coanda airfoil means is embodied in terms of a slotted airfoil structure 30 having a plurality of spaced-apart longitudinally extending slots 30$^a$. The remaining structure of the ejector system of FIG. 4 is substantially identical to that hereinbefore described in conjunction with FIG. 3. It should be noted, however, that the inlet guide vanes 27 and 28 are omitted from the illustration in FIG. 4.

Figure 2:
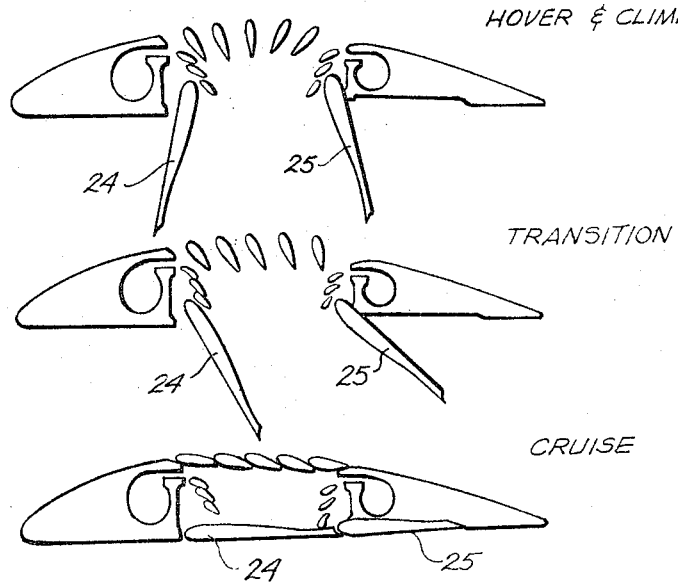
FIG. 2 is a schematic illustration of the ejector system of FIG. 1 in the various conditions of flight.

The illustration in FIG. 2 shows the various positions of the shrouds 24 and 25 during operation of the vehicle 12. The three positions of the shrouds 24 and 25 are illustrated for (1) cruising (2) hovering or climbing and (3) the intermediate or transition position.

What is claimed is:

1. In an aerodynamic vehicle capable of vertical take-off and landing including a wing having a plurality of engines mounted thereon for propelling the vehicle and ejector means constructed and defined within the wing to receive the engine exhaust for vertically lifting the vehicle into flight, each of said ejector means comprising fluid duct means receiving and conveying the engine exhaust and dividing the exhaust flow into jet sheets, Coanda airfoil means having means for entraining the ambient air into the exhaust flow arranged adjacent the fluid duct means for receiving the jet sheets over their exterior surfaces and constructed and defined for rotating them through approximately 90 degrees, a mixing chamber arranged downstream of the airfoil means for receiving and mixing the rotated jet sheets, and means for diffusing and controlling the boundary layer of the mixed flow.

2. In an aerodynamic vehicle as defined in claim 1 wherein said Coanda airfoil means comprises a slotted airfoil.

3. In an aerodynamic vehicle as defined in claim 1 wherein said Coanda airfoil means comprises a plurality of spaced apart airfoil cascades.

4. In an aerodynamic vehicle capable of vertical take-off and landing including a wing having a plurality of engines mounted thereon for propelling the vehicle and ejector means constructed and defined within the wing to receive the engine exhaust for vertically lifting the vehicle into flight, each of said ejector means comprising a pair of serrated nozzles for receiving and conveying the engine exhaust and dividing the exhaust flow into two separate, serrated jet sheets, a plurality of Coanda airfoil means symmetrically arranged and spaced apart adjacent said nozzles for receiving the jet sheets over their exterior surfaces and constructed and defined for rotating them to cause a radial static pressure gradient to exist across the inlet of the ejector for producing flow induction through jet entrainment of the ambient fluid, a mixing chamber arranged downstream of the airfoil means for receiving and mixing the rotated jet sheets, and means for diffusing the mixed flow.

5. In an aerodynamic vehicle as defined in claim 4 wherein said diffusing means includes boundary layer control means.

6. In an aerodynamic vehicle as defined in claim 5 wherein said diffusing means further includes jet nozzles at the exit of the diffusing means.

7. In an aerodynamic vehicle as defined in claim 6 including a plurality of spaced apart inlet guide vanes arranged between said serrated nozzles.

8. In an aerodynamic vehicle as defined in claim 5 wherein said diffusing means comprises divergently shaped diffuser shrouds having a shaped aperture for boundary layer control defined adjacent the mixing chamber and spaced from the mixing chamber.

9. A method for operating an ejector provided for an aerodynamic vehicle including the steps of conveying the exhaust of the vehicle to the ejector, rotating the exhaust flow by means of the Coanda effect, exposing the exhaust flow during rotation to the exhaust flow at a plurality of spaced-apart locations for entraining the ambient air into the exhaust flow at said locations, and diffusing the resulting exhaust flow.

10. In an aerodynamic vehicle as defined in claim 1 wherein said diffusing means further includes jet nozzles at the exit of the diffusing means.

References Cited

UNITED STATES PATENTS

| | | | |
|---|---|---|---|
| 2,945,641 | 7/1960 | Pribran | 244—12 B |
| 2,973,922 | 3/1961 | Davidson et al. | 244—42 CC |
| 2,986,359 | 5/1961 | Tino | 244—23 BX |
| 3,045,947 | 7/1962 | Bertin | 244—42 CCX |
| 3,047,208 | 7/1962 | Coanda | 417—197 X |
| 3,332,644 | 7/1967 | Whittley | 244—42 CC |
| 3,331,462 | 7/1967 | Wernicke | 244—42 RX |
| 3,545,701 | 12/1970 | Bertin | 244—12 B |

MILTON BUCHLER, Primary Examiner

C. A. RUTLEDGE, Assistant Examiner